(12) United States Patent
Yukihara et al.

(10) Patent No.: US 7,363,787 B2
(45) Date of Patent: Apr. 29, 2008

(54) STEERING LOCK SYSTEM WITH CONTROL KNOB FOR VEHICLE

(75) Inventors: Jin Yukihara, Miyazaki (JP); Mikihiko Kawase, Miyazaki (JP); Kazunaga Kasai, Saitama (JP)

(73) Assignees: Honda Motor Co., Ltd., Tokyo (JP); Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 11/061,323

(22) Filed: Feb. 18, 2005

(65) Prior Publication Data
US 2005/0235712 A1 Oct. 27, 2005

(30) Foreign Application Priority Data
Mar. 26, 2004 (JP) .............................. 2004-091724

(51) Int. Cl.
*B60R 25/02* (2006.01)
(52) U.S. Cl. .............................. 70/252; 70/423; 70/455
(58) Field of Classification Search .................. 70/423, 70/424, 454, 455, 252
See application file for complete search history.

(56) References Cited

U.S. PATENT DOCUMENTS

| | | | | |
|---|---|---|---|---|
| 2,096,568 | A | * | 10/1937 | Snively ........................ 70/455 |
| 3,625,035 | A | * | 12/1971 | Brummer et al. ............. 70/365 |
| 4,262,508 | A | * | 4/1981 | Davidson ...................... 70/455 |
| 4,280,633 | A | * | 7/1981 | Boros .......................... 220/241 |
| 4,665,728 | A | * | 5/1987 | Azzara ......................... 70/427 |
| 5,379,617 | A | * | 1/1995 | Zagoroff ........................ 70/18 |
| 5,563,387 | A | * | 10/1996 | Myers et al. ............. 200/43.03 |
| 6,152,483 | A | * | 11/2000 | Quigley ...................... 280/735 |
| 6,272,890 | B1 | * | 8/2001 | Huston ........................ 70/423 |
| 6,941,779 | B2 | * | 9/2005 | Shigeyama et al. ........... 70/186 |

FOREIGN PATENT DOCUMENTS

| | | |
|---|---|---|
| JP | 07-25168 | 5/1995 |
| JP | 07-137779 | 5/1995 |
| JP | 08-326367 | 12/1996 |
| JP | 2003-261008 | 9/2003 |
| JP | 2004-060316 | 2/2004 |
| JP | 2004-324204 | 11/2004 |

* cited by examiner

*Primary Examiner*—Suzanne Dino Barrett
(74) *Attorney, Agent, or Firm*—Carrier, Blackman & Associates, P.C.; Joseph P. Carrier; William D. Blackman (57) ABSTRACT

A steering lock system with a control knob for a vehicle, comprises: a cylinder rotatably carried in a stationary housing; a rotor relatively rotatably inserted into the cylinder and having a key hole into which a mechanical key can be inserted; and a control knob mounted on the rotor. In the steering lock system, the control knob comprises: a knob body fixed to the rotor and having a key guide hole for guiding the insertion of the mechanical key into the key hole; and a knob cap detachably mounted to the knob body to cover the entire knob body in such a manner that its outer surface forms a design face.

12 Claims, 5 Drawing Sheets

STEERING LOCK SYSTEM WITH CONTROL KNOB FOR VEHICLE

RELATED APPLICATION DATA

The Japanese priority application No. 2004-91724 upon which the present application is based is hereby incorporated in its entirety herein by reference.

BACKGROUND OF THE INVENTION

1. Field of the Invention

The present invention relates to a steering lock system with a control knob for a vehicle, comprising: a cylinder rotatably carried in a stationary housing; a rotor relatively rotatably inserted into the cylinder and having a key hole into which a mechanical key can be inserted; and a control knob mounted on the rotor.

2. Description of the Related Art

There is a conventionally known steering lock system, which comprises a control knob mounted on a rotor of the steering lock system in order to enable the rotor to be rotated without use of a mechanical key, when ID codes are matched in communication between a portable instrument carried by a vehicle user and the steering lock system on a vehicle. In this system, in order to prevent the erroneous operation due to the insertion of the mechanical key into a key hole in a state in which the rotor has been rotated using the control knob, and in order to enable the operation of rotating the rotor using the mechanical key, the control knob comprises: a knob body fixed to the rotor and having a key guide hole connected to the key hole; and a knob cap mounted to the knob body to inhibit the insertion of the mechanical key into the key guide hole (see Japanese Patent Application Laid-open No. 2004-60316).

In the conventional system, however, the knob cap is detachably mounted to the knob body in such a manner that a portion of the knob cap is removably inserted into the key guide hole in the knob body, and mating surfaces of the knob cap and the knob body appear on a design face on an outer surface of the control knob. Therefore, there is no integral appearance between the knob body and the knob cap, and it is difficult to mention that this system is excellent in design, and moreover the degree of freedom of changing the design corresponding to the type of the system is narrowed.

SUMMARY OF THE INVENTION

Accordingly, it is an object of the present invention to provide a steering lock system with a control knob for a vehicle, wherein the integral appearance between the knob body and the knob cap can be enhanced to ensure an excellent design property, and moreover the degree of freedom of changing the design is increased.

To achieve the above object, according to a first feature of the present invention, there is provided a steering lock system with a control knob for a vehicle, comprising: a cylinder rotatably carried in a stationary housing; a rotor relatively rotatably inserted into the cylinder and having a key hole into which a mechanical key can be inserted; and a control knob mounted on the rotor, wherein the control knob comprises: a knob body fixed to the rotor and having a key guide hole for guiding the insertion of the mechanical key into the key hole; and a knob cap detachably mounted to the knob body to cover the entire knob body in such a manner that its outer surface forms a design face.

With the first feature of the present invention, the entire knob body is covered with the knob cap which constitutes the control knob by cooperation with the knob body, and the outer surface of the knob cap forms the design face. Therefore, mating surfaces of the knob body and the knob cap cannot appear on the design face on the outer surface of the control knob, and hence it is possible to enhance the integral appearance between the knob body and the knob cap to ensure an excellent design property. Even when the design of the control knob is changed corresponding to the type of the system, only the design of the knob cap is required to be changed, and hence the degree of freedom of changing the design corresponding to the type of the system can be increased.

According to a second feature of the present invention, in addition to the first feature, the knob body is integrally provided with an engagement claw adapted to resiliently engage into an engagement hole made in the knob cap, which is provided with an insertion hole into which the mechanical key can be inserted in a direction to urge the engagement claw to be disengaged from the engagement hole.

With the second feature of the present invention, when the rotor is rotated using the mechanical key, the knob cap can be removed from the knob body by an operation of canceling the resilient engagement of the engagement claw in the engagement hole using the mechanical key, and hence a special tool is not required for removing the knob cap from the knob body.

The above and other objects, features and advantages of the invention will become apparent from the following description of the preferred embodiment taken in conjunction with the accompanying drawings.

DETAILED DESCRIPTION OF PREFERRED EMBODIMENT

The present invention will now be described by way of one embodiment with reference to the accompanying drawings.

Figure 1:
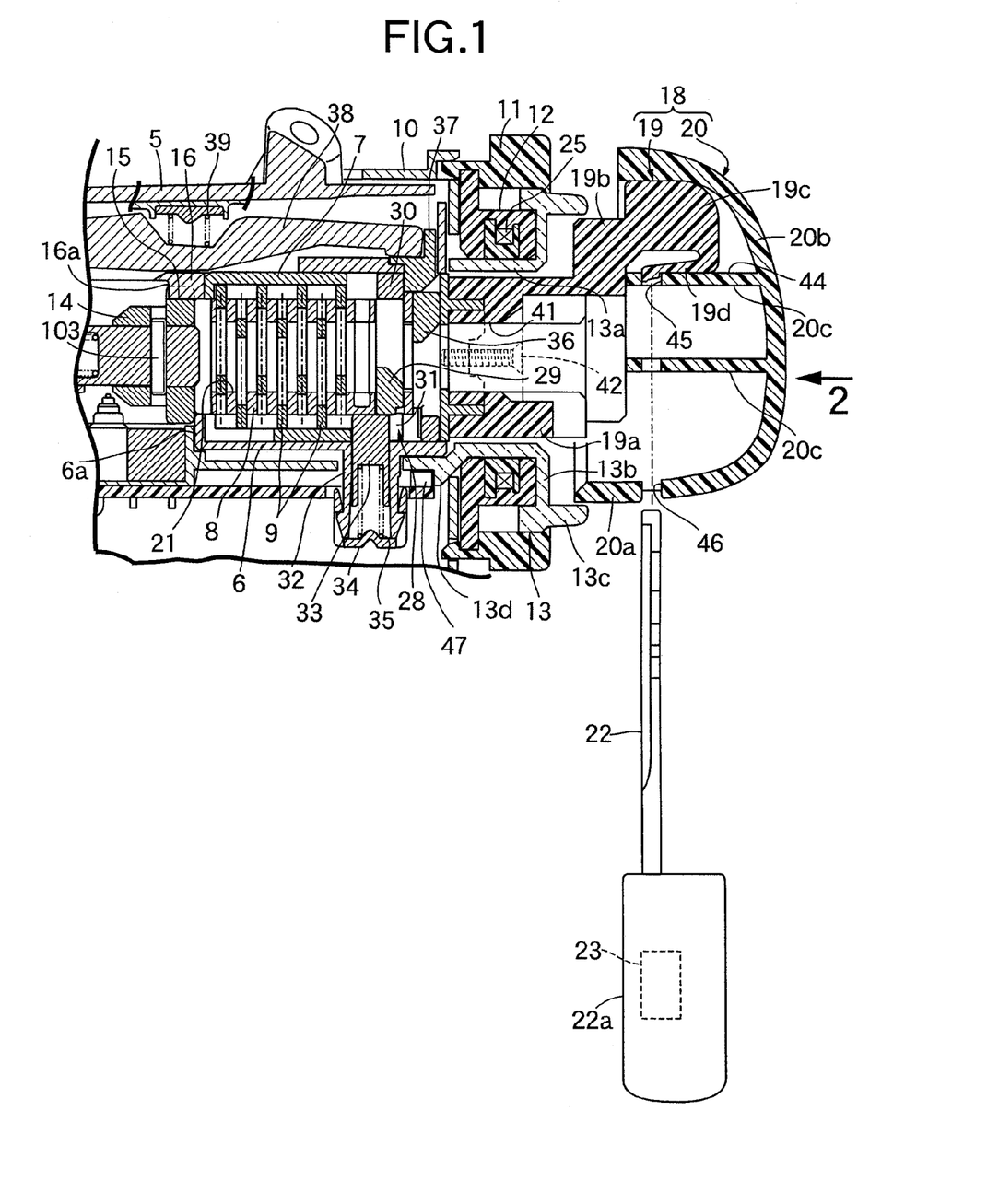
FIG. 1 is a longitudinal sectional side view of essential portions of a steering lock system with a control knob for a vehicle.

Referring first to FIG. 1, a body 5 made of a metal is mounted to a steering column which is not shown. A rotor 8 urged forwards (rightwards in FIG. 1) by a spring is relatively rotatably inserted into a cylinder 7 which is turnably carried in a housing 6 fixed to the body 5. A plurality of tumblers 9 are built in the rotor 8 and capable of being switchably brought into and out of engagement with the cylinder 7. The rotor 8 is operatively connected at its rear end to a locking mechanism (not shown) adapted to switch-over the locking and unlocking of a steering shaft (not shown) as well as to a rotary switch (not shown) for changing the switching mode in accordance with the rotation of the rotor 8.

A cylinder cap 10 is mounted at a front end of the body 5 to cover a front end of the housing 6. Disposed in front of the cylinder cap 10 are a cylindrical position cap 11 mounted to the cylinder cap 10, a ring member 12 supported in the position cap 11 and disposed within the position cap 11, and a lens 13 clamped between the position cap 11 and the ring member 12 to cover an inner periphery and a front surface of the ring member 12.

Figure 2:
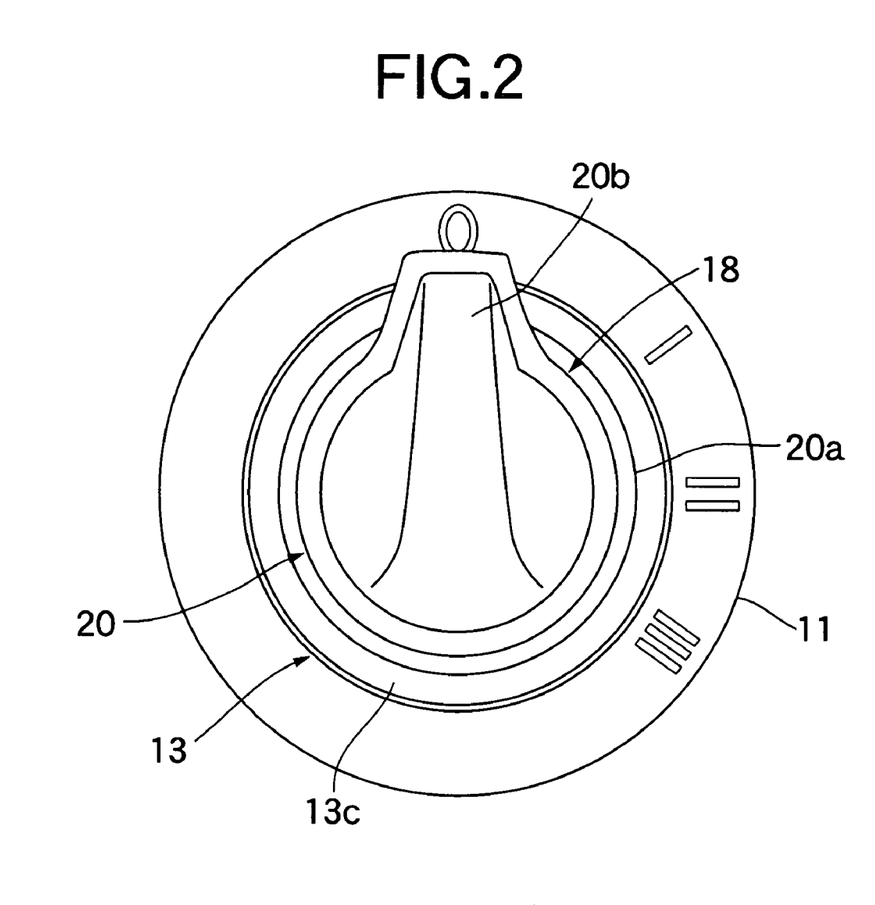
FIG. 2 is a front view taken in a direction of an arrow 2 in FIG. 1.

Referring also to FIG. 2, the following positions are indicated on a front surface of the position cap 11 at intervals in a circumferential direction: a "0" position which is a LOCK position in which the locking mechanism is in a locked state; a "I" position which is an ACC position in which an electric power can be supplied to an auxiliary other than an engine; a "II" position which is an ON position for turning the engine on; and a "III" position which is a START position for starting the engine.

A ring-shaped collar 14 is fixed by a spring pin 103 to the rotor 8 in the rear of the housing 6. The housing 6 is provided at its rear end with a brim 6a for thrust-bearing a rear end of the cylinder 7, so that the advancement limit of the rotor 8 urged forwards by the spring is defined by the abutment of the collar 14 against the brim 6a of the housing 6.

A restricting groove 15 is provided around an outer periphery of the collar 14 to extend axially. An engagement projection 16 is provided at the rear end of the housing 6 to inhibit the rotation of the rotor 8 by bringing the rotor 8 situated at the LOCK position into engagement with the restricting groove 15 in a state in which the collar 14 is in a position of the advancement limit where the collar 14 is in abutment against the brim 6a. Therefore, to rotate the rotor from the LOCK position to the ACC position, an operation is required for pushing the rotor 8 into a position in which the engagement projection 16 is out of engagement with the restricting groove 15, against a forward biasing force of the spring. Moreover, when the rotor 8 pushed is rotated toward the ACC position, it is rotated, while a front surface of the collar 14 is put in sliding contact with a cam face 16a formed on a rear surface of the engagement projection 16. The cam face 16a is formed so as to guide the collar 14 in sliding contact with the cam face 16a in response to the rotation of the rotor 8 from the ACC position toward the ON position, so that the rotor 8 is returned to a position assumed before the pushing operation.

Namely, to rotate the rotor 8 from the LOCK position toward the ACC position, the operation of pushing the rotor 8 is required, and the rotor 8 is advanced to the initial position in response to the further rotation from the ACC toward the ON position. On the other hand, when the rotor 8 is rotated from the ON position or the ACC position toward the LOCK position, an operation of pushing the rotor 8 against the spring force is required.

The rotor 8 is also provided at its front end with a bottomed key hole 21, to which an opening in the front end faces. The key hole 21 is formed so that its cross-sectional shape is a rectangular shape extending longer along one diametrical line of the rotor 8 to enable the insertion of a mechanical key 22 into the key hole 21.

A transponder 23 is built in a grip portion 22a of the mechanical key 22. On the other hand, an antenna 25 is contained in the ring member 12 for communication with the transponder 23 upon insertion of the mechanical key 22 into the key hole 21. If the mechanical key 22 is used, only when it has been confirmed that the mechanical key 22 is a genuine mechanical key based on the communication between the transponder 23 and the antenna 25, the starting of the engine is made possible.

The tumblers 9 radially outwards urged by the spring are contained at a plurality of points spaced apart from one another in an axial direction of the rotor 8. A plurality of tumbler engagement grooves 26 for engagement with the tumblers 9 are provided in an inner surface of the cylinder 7 to extend axially. When the genuine mechanical key 22 has been inserted into the key hole 21 in the rotor 8, the tumblers 9 are moved to positions in which they are out of engagement with the tumbler engagement grooves 26, thereby permitting the rotation of the rotor 8. On the other hand, in a state in which the genuine mechanical key 22 is not inserted into the key hole 21, the tumblers 9 remain in engagement with the tumbler engagement grooves 26 in the cylinder 7, and hence the axial movement of the rotor 8 relative to the cylinder 7 is permitted, but the rotation of the rotor 8 relative to the cylinder 7 is inhibited.

The engagement of the tumblers 9 enables the rotation of the cylinder 7 in a state in which it is incapable of being rotated relative to the rotor 8, upon confirmation that ID cords have been matched in the communication between a vehicle and a portable instrument carried by a vehicle user and accompanying the pushing of a control knob 18 mounted at the front end of the rotor 8 as a trigger. When the operation by the control knob 18 has been permitted in response to the matching of ID cords, the rotor 8 can be rotated along with the cylinder 7 from the LOCK position, via the ACC position and the ON position, to the START position by grabbing and manually operating the control knob 18.

A key insertion restricting means 28 is mounted at a front portion of the rotor 8, to enable the insertion of the mechanical key 22 into the key hole 21 in a state in which the rotor 8 is in the LOCK position, but to inhibit the insertion of the mechanical key 22 into the key hole 21 when the rotor 8 has been rotated from the LOCK position to the ACC position using the control knob 18.

The key insertion restricting means 28 comprises a slider 29 and a sliding restricting member 30. The slider 29 is mounted to the rotor 8 in such a manner that it is urged toward an insertion inhibiting position, while being capable of being slid between an insertion permitting position for permitting the insertion of the mechanical key 22 into the keyhole 21 and an insertion inhibiting position for inhibiting the insertion of the mechanical key 22 into the key hole 21; and that an urging force from the mechanical key 22 toward the insertion permitting position is applied to the slider 29 in response to the insertion of the mechanical key 22 into the keyhole 21. The sliding restricting member 30 is mounted to the rotor 8 in such a manner that the slider 29 is permitted to be slid to the insertion permitting position in a state in which the rotor 8 is in the LOCK position, but the sliding of the slider 29 to the insertion permitting position is inhibited when the rotor 8 has been moved from the LOCK position.

The slider 29 is received in a front portion of the rotor 8, so that the slider 29 can be slid in a direction along one diametrical line of the rotor 8 between the insertion permitting position in which a portion of the slider 29 protrudes from the rotor 8 to permit the insertion of the mechanical key 22 into the key hole 21, and the insertion inhibiting position in which one end face of the slider 29 is flush with an outer surface of the rotor 8 to inhibit the insertion of the mechanical key 22 into the key hole 21. The sliding restricting member 30 is formed into a ring shape surrounding the rotor 8, and is provided with a restricting hole 31 into which one end of the slider 29 in the insertion permitting position can be engaged.

On the other hand, a guide tube 32 is integrally provided on the housing 6 in such a manner that it is connected to the restricting hole 31 when the rotor 8 is in the LOCK position. An inner end of a key switch slider 33 slidably received in the guide tube 32 is caused to abut against one end of the slider 29 when the rotor 8 is in the LOCK position. Moreover, a spring 35 is mounted under compression between a cap 34 occluding an outer end of the guide tube 32 and the key switch slider 33, so that the key switch slider 33 is urged by the spring in a direction to abut against the slider 29, and the slider 29 is urged toward the insertion inhibiting position by a spring force of the spring 35 in a state in which the key switch slider 33 and the slider 29 are in abutment against each other.

When the rotor 8 is in the LOCK position, contact surfaces of the key switch slider 33 and the slider 29 received in the restricting hole 31 by the spring force of the spring 35 are flush with the outer surface of the rotor 8, and when the rotor 8 has been rotated from the LOCK position to the ACC position by the control knob 18, the slider 29 is rotated along with the rotor 8, while remaining in the insertion inhibiting position. Therefore, when the rotor 8 has been rotated from the LOCK position to the ACC position by the control knob 18, the mechanical key 22 cannot be inserted into the key hole 21 in the rotor 8.

On the other hand, when the mechanical key 22 has been inserted into the key hole 21 in the rotor 8 which is in the LOCK position, the urging force toward the insertion permitting position is applied from the mechanical key 22 to the slider 29, whereby one end of the slider 29 is brought into engagement with the restricting hole 31 in the sliding restricting member 30, and thus the contact surfaces of the slider 29 and the key switch slider 33 are flush with the outer surface of the sliding restricting member 30. Therefore, when the rotor 8 is rotated from the LOCK position with the mechanical key 22 remaining inserted into the key hole 21, the slider 29 is rotated along with the rotor 8, while being in sliding contact with the inner surface of the housing 6, and the key switch slider 33 is brought into sliding contact with the outer surface of the sliding restricting member 30.

The movement of the key switch slider 33 in response to the sliding of the slider 29 to the insertion permitting position with the insertion of the mechanical key 22 into the key hole 21, is detected by a switch which is not shown.

A first key slider 36 is slidably mounted at the front portion of the rotor 8 in front of the slider 29, so that the first key slider 36 is slid on one direction along the one diametrical line of the rotor 8 by the insertion of the mechanical key 22 into the key hole 21. A second key slider 37 is slidably mounted at the front portion of the housing 6 to come into contact with the first key slider 36 in such a manner that the second key slider 37 is urged by the first key slider 36 upon insertion of the mechanical key 22 into the key hole 21. The second key slider 37 is slid, pushed by the rotor 8, so that it protrudes outwards from the housing 6, when the rotor 8 is pushed by the control knob 18.

Namely, either when the mechanical key 22 has been inserted into the key hole 21 and when the rotor 8 has been pushed by the control knob 18 without insertion of the mechanical key 22 into the key hole 21, the second key slider 37 is urged away from the rotor 8.

A front end of a control lever 38 turnably carried on the body 5 to extend longitudinally within the body 5, is disposed outside the second key slider 37. A spring 39 is interposed between the control lever 38 and the body 5, so that the control lever 38 is urged by a spring force of the spring 39 in a direction that its front end abuts against the second key slider 37. Then, the control lever 38 is rotated in a direction opposite from the direction of biasing by the spring 39, in response to the sliding of the second key slider 37 in a radially outward direction of the rotor 8.

The control lever 38 functions to maintain the unlocking state of the locking mechanism. The unlocking state of the locking mechanism is maintained by the turning of the control lever 38 in response to the sliding of the second key slider 37 in the radially outward direction of the rotor 8. Moreover, even when the rotor 8 is in the LOCK position, unless the control lever 38 is turned in the direction of biasing by the spring 39, the locking mechanism remains maintained in the unlocking state by withdrawing the mechanical key 22 out of the key hole 21 or by canceling the pushing of the rotor 8.

Figure 3:
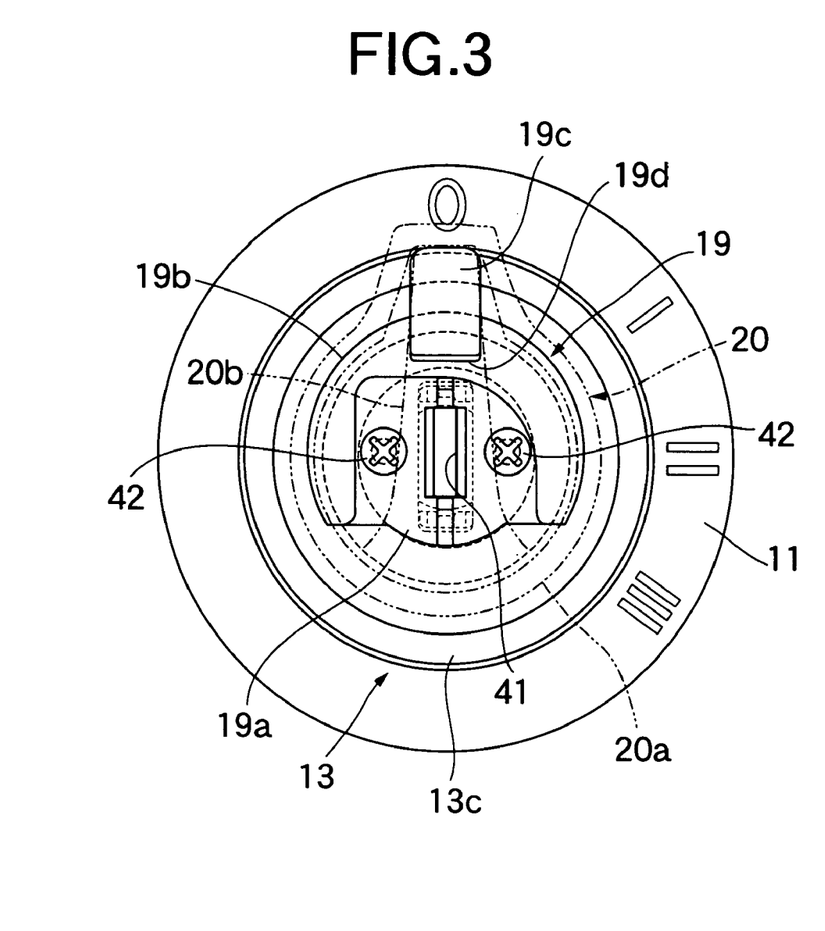
FIG. 3 a front view similar to FIG. 2, but in a state in which the knob cap has been removed.
Figure 4:
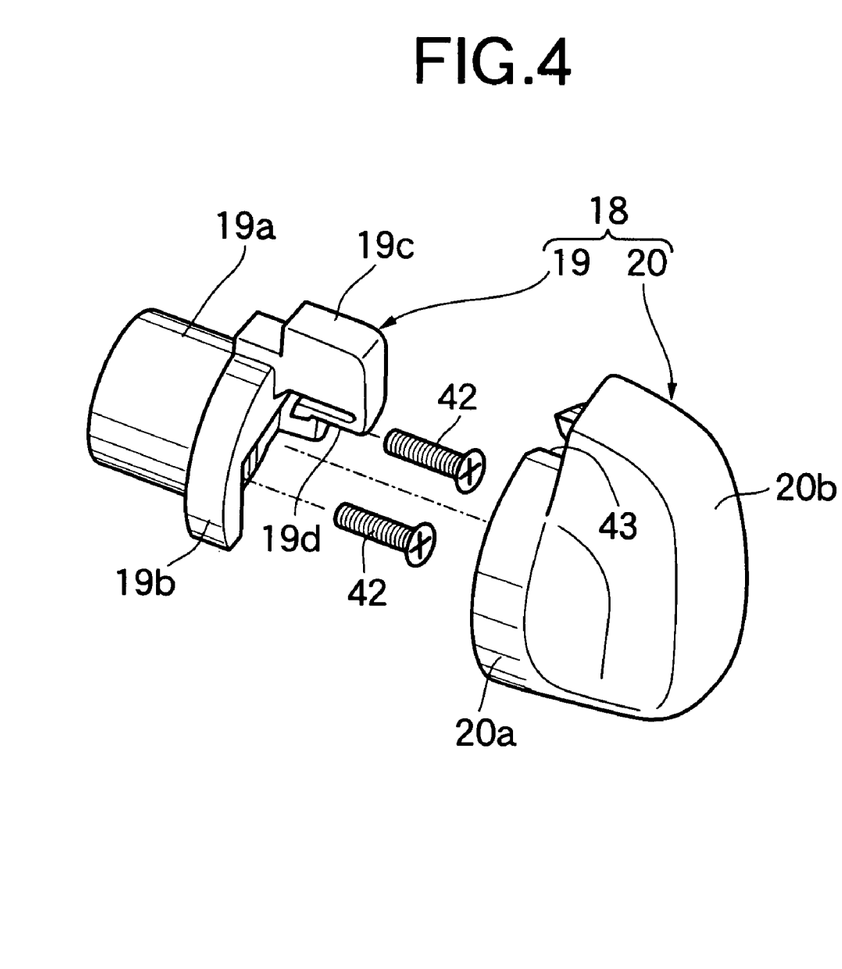
FIG. 4 is an exploded perspective view of the control knob.

Referring to FIGS. 3 and 4 together, the control knob 18 comprises: a synthetic resin knob body 19 fixed to the front end of the rotor 8 and having a key guide hole 41 for guiding the insertion of the mechanical key 22 into the key hole 21 in the rotor 8; and a synthetic resin knob cap 20 detachably mounted to the knob body 19 to cover the entire knob body 19 in such a manner that its outer surface forms a design face.

The knob body 19 is integrally provided with: an insertion portion 19a which has the key guide hole 41 and which is inserted into the ring member 11; a frame 19b which is formed into a substantially U-shape to surround the entire opening of the key guide hole 41 and which overhangs sideways from a front end of the insertion portion 19a; a projection 19c protruding forwards from a central portion of a circumferentially front end of the frame 19b; and an engagement claw 19d connected to a tip end of the projection 19c in such a manner it is located inside and sideways of the projection 19c. The insertion portion 19a is fixed to the front end of the rotor 8 by a pair of screw members 42, 42 disposed on opposite sides of the key guide hole 41. Moreover, the knob body 19 is fixed to the rotor 8 in such a manner that the projection 19c is in a position corresponding to the LOCK position in a state in which the rotor 8 is in the LOCK position.

On the other hand, the knob cap 20 is formed into a bowl shape, and integrally provided with a short cylindrical portion 20a into which the frame 19b of the knob body 19 is fitted, and a grip portion 20b which occludes the short cylindrical portion 20a from a side opposite from the knob body 19. The short cylindrical portion 20a is provided with an opening 43 in which a portion of the projection 19c of the knob body 19 is disposed. The grip portion 20b is formed so that it extends through a long distance in a direction interconnecting the key guide hole 41 and the projection 19c of the knob body 19, and protrudes outwards and sideways from the short cylindrical portion 20a in a region corresponding to the opening 43.

The knob cap 20 is also integrally provided with a plurality of ribs 20c disposed within the knob cap 20 to extend perpendicular to the knob cap 20. A fitting recess 44 into which the projection 19c and the engagement claw 19d of the knob body 19 are resiliently fitted, is defined by one of the ribs 20c and inner surfaces of the short cylindrical portion 20a and the grip portion 20b.

Moreover, the rib 20c constituting a portion of the fitting recess 44 is provided with an engagement hole 45 for resilient fitting of the engagement claw 19d therein, so that the engagement claw 19d is resiliently engaged into the engagement hole 45 by fitting the projection 19c and the engagement claw 19d into the fitting recess 44, while flexing the engagement claw 19d, whereby the knob cap 20 is mounted to the knob body 19 while covering the entire knob body 19. A protrusion of the grip portion 20b from the short cylindrical portion 20a points to one of the "0" to "III" positions indicated on the front surface of the position cap 11, in a state in which the knob cap 20 has been mounted to the knob body 19. At the LOCK position of the rotor 8, the protrusion of the grip portion 20b is in a position corresponding to the "0" position.

An insertion hole 46, into which the mechanical key 22 can be inserted in a direction to urge the engagement claw 19d to be disengaged from the engagement hole 45, is provided in the grip portion 20b and the ring 20c of the knob cap 20, so that the insertion hole 46 opens into the outer surface of the grip portion 20b on a side opposite from the protrusion of the grip portion 20b. The direction of insertion of the mechanical key 22 into the insertion hole 46 is therefore perpendicular to and crosses the direction of insertion of the mechanical key 22 into the key hole 21.

The lens 13 comprises: a smaller-diameter cylindrical portion 13a interposed between the insertion portion 19a of the knob body 19 of the control knob 18 and the ring member 11; a brim 13b which overhangs radially outwards from a front end of the smaller-diameter cylindrical portion 13a to cover the ring member 12 from the front; a larger-diameter cylindrical portion 13c protruding forwards from an outer periphery of the brim 13b; and a light guide 13d extending rearwards from the smaller-diameter cylindrical portion 13a, so that light from a light-emitting element 47 such as a light-emitting diode is introduced into the light guide 13d.

The control knob 18 is illuminated over its entire periphery with light radiated from the lens 13, and moreover the surrounding of the key guide bore 41 in the knob body 19 is illuminated, as clearly shown in FIG. 3, as the knob body 19 with the knob cap 20 removed therefrom is viewed from the front.

The operation of this embodiment will be described below. The control knob 18 provided on the rotor 8 which is relatively rotatably inserted into the cylinder 7 and has the key hole 21 into which the mechanical key 22 can be inserted, comprises: the knob body 19 fixed to the rotor 8 and having the key guide hole 41 for guiding the insertion of the mechanical key 22 into the key hole 21; and the knob cap 20 detachably mounted to the knob body 19 to cover the entire knob body 19 in such a manner that its outer surface forms the design face.

Therefore, mating surfaces of the knob body 19 and the knob cap 20 cannot appear on the design face on the outer surface of the control knob 18, and hence the integral appearance between the knob body 19 and the knob cap 20 can be enhanced to ensure an excellent design property. In addition, to change the design of the control knob 18 corresponding to the type of the system, only the design of the knob cap 20 is required to be changed, and hence the degree of freedom of changing the design can be increased.

Figure 5:
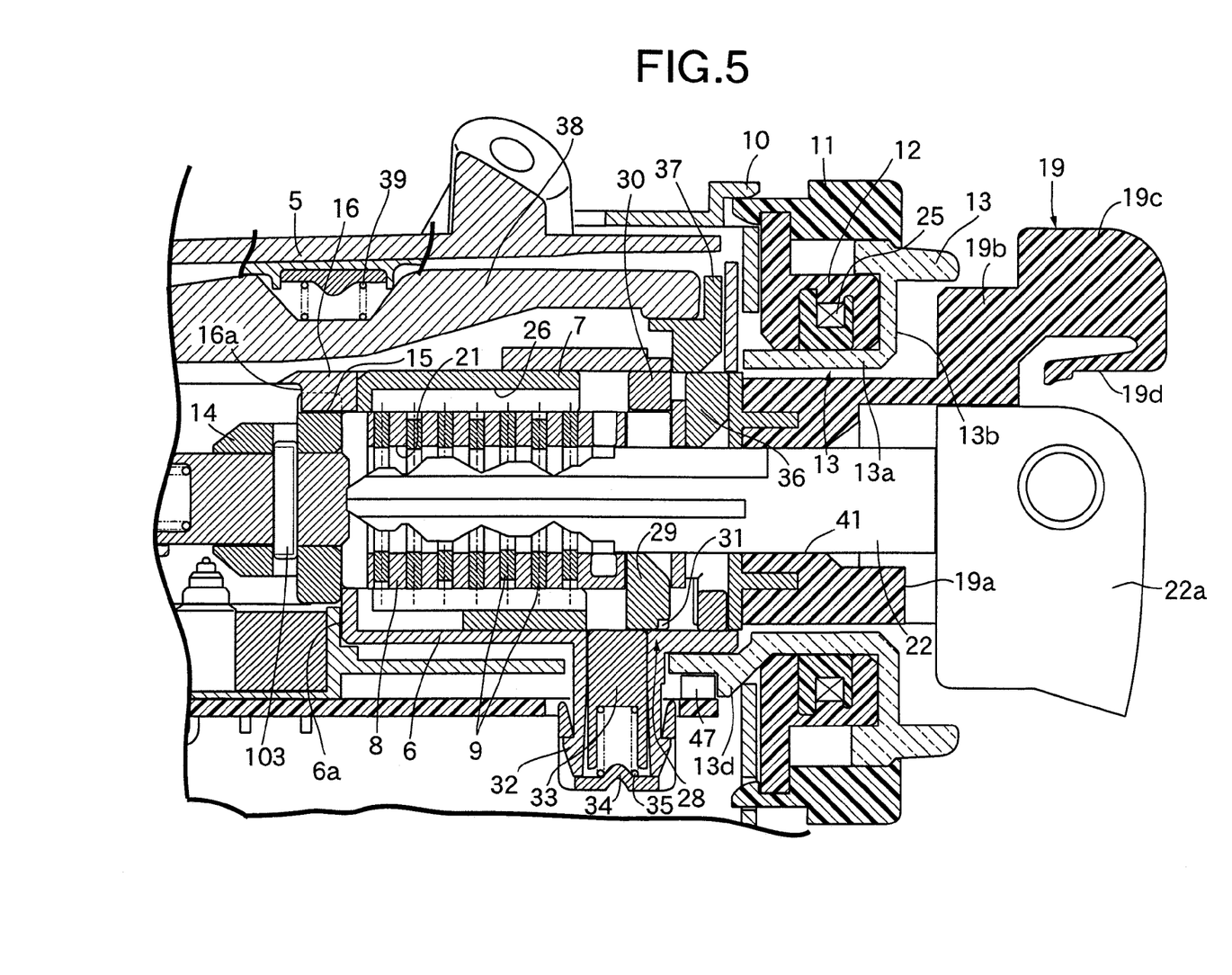
FIG. 5 is a sectional view similar to FIG. 1, but a mechanical key is used.

In addition, the knob body 19 is integrally provided with the engagement claw 19d adapted to resiliently engage into the engagement hole 45 provided in the knob cap 20, and the knob cap 20 is provided with the insertion hole 46 into which the mechanical key 22 can be inserted in the direction to urge the engagement claw 19d to be disengaged from the engagement hole 45. Therefore, to rotate the rotor 8 using the mechanical key 22, the operation of canceling the resilient engagement of the engagement claw 19d with the engagement hole 45 using the mechanical key 22 is conducted to remove the knob cap 20 from the knob body 19, as shown in FIG. 5, and hence a special tool is not required for removing the knob cap 20 from the knob body 19.

Although the embodiment of the present invention has been described in detail, the present invention is not limited to the above-described embodiment, and various modifications in design may be made without departing from the subject matter of the invention defined in the claims.

What is claimed is:

1. A steering lock system with a control knob for a vehicle, said steering lock system comprising:
   a cylinder rotatably carried in a stationary housing;
   a rotor relatively rotatably inserted into the cylinder and having a key hole into which a mechanical key can be inserted; and
   a control knob mounted on the rotor,
   wherein the control knob comprises: a knob body fixed to the rotor and having a key guide hole for guiding the insertion of the mechanical key into the key hole; and a knob cap detachably mounted to the knob body to cover the entire knob body in such a manner that an outer surface of the knob cap is aesthetically pleasing,
   wherein the knob body is integrally provided with an engagement claw adapted to resiliently engage into an engagement hole made in the knob cap,
   wherein the engagement claw resiliently flexes when being engaged into and out of the engagement hole, and
   wherein the knob cap is provided with an insertion hole into which the mechanical key can be inserted in a direction to urge the engagement claw to be disengaged from the engagement hole.

2. A steering lock system with a control knob for a vehicle according to claim 1, wherein the outer surface of the knob cap is continuous and unperforated such that the knob cap serves to obscure the key hole from view.

3. A steering lock system with a control knob for a vehicle according to claim 1, wherein the knob body integrally comprises:
   an insertion portion which includes the key guide hole;
   a frame which is formed into a substantially U-shape to surround the opening of the key guide hole, and which overhangs the key guide hole from a front end of the insertion portion, so as to project forward along an upper portion and sides of the key guide hole;
   a projection protruding forwards from a central portion of a circumferentially front end of the frame; and
   an engagement claw connected to a tip end of the projection so as to be located inside and sideways relative to the projection.

4. A steering lock system with a control knob for a vehicle according to claim 3, wherein the knob cap is formed into a bowl shape, and integrally comprises:
   a short cylindrical portion into which the frame of the knob body is fitted, and which includes an opening in which a portion of the projection of the knob body is disposed; and
   a grip portion which obstructs from view the short cylindrical portion from a side opposite from the knob body, and which is formed so that said grip portion extends through a long distance in a direction interconnecting the key guide hole and the projection of the knob body, and protrudes outwards and sideways from the short cylindrical portion in a region corresponding to the opening.

5. A steering lock system with a control knob for a vehicle according to claim 4, wherein the knob cap further comprises a plurality of ribs integrally disposed on an inner surface of the knob cap and extending perpendicular to the inner surface of the knob cap.

6. A steering lock system with a control knob for a vehicle according to claim 3, wherein the knob cap further comprises a fitting recess formed on an inner surface thereof into which the projection and the engagement claw of the knob body are resiliently fitted.

7. A steering lock system with a control knob for a vehicle according to claim 1, wherein all outer surfaces of the knob body, the key hole and the key guide hole are completely covered by the knob cap.

8. A steering lock system with a control knob for a vehicle according to claim 1, wherein the knob cover and the knob body are rigid members.

9. A steering lock system with a control knob for a vehicle according to claim 1, wherein the control knob is rotatable into different operative positions.

10. A steering lock system with a control knob for a vehicle, said steering lock system comprising:
a cylinder rotatably carried in a stationary housing;
a rotor relatively rotatably inserted into the cylinder and having a key hole into which a mechanical key can be inserted; and
a control knob mounted on the rotor,
wherein the control knob comprises: a knob body fixed to the rotor and having a key guide hole for guiding the insertion of the mechanical key into the key hole; and a knob cap detachably mounted to the knob body to cover the entire knob body in such a manner that an outer surface of the knob cap is aesthetically pleasing,
wherein the knob body is integrally provided with an engagement claw adapted to resiliently engage into an engagement hole made in the knob cap,
wherein the knob cap is provided with an insertion hole into which the mechanical key can be inserted in a direction to urge the engagement claw to be disengaged from the engagement hole, and
wherein the direction of insertion of the mechanical key into the insertion hole crosses a direction of the insertion of the mechanical key into the key hole.

11. A steering lock system with a control knob for a vehicle, comprising:
a cylinder rotatably carried in a stationary housing;
a rotor relatively rotatably inserted into the cylinder and having a key hole into which a mechanical key can be inserted; and
a control knob mounted on the rotor,
wherein the control knob comprises: a knob body fixed to the rotor and having a key guide hole for guiding the insertion of the mechanical key into the key hole; and a knob cap detachably mounted to the knob body to cover the entire knob body in such a manner that an outer surface of the knob cap is aesthetically pleasing,
wherein the knob body integrally comprises:
an insertion portion which includes the key guide hole;
a frame which is formed into a substantially U-shape to surround the opening of the key guide hole, and which overhangs the key guide hole from a front end of the insertion portion, so as to project forward along an upper portion and sides of the key guide hole;
a projection protruding forwards from a central portion of a circumferentially front end of the frame; and
an engagement claw connected to a tip end of the projection so as to be located inside and sideways relative to the projection, and
wherein the knob cap is formed into a bowl shape, and integrally comprises:
a short cylindrical portion into which the frame of the knob body is fitted, and which includes an opening in which a portion of the projection of the knob body is disposed; and
a grip portion which obstructs from view the short cylindrical portion from a side opposite from the knob body, and which is formed so that said grip portion extends through a long distance in a direction interconnecting the key guide hole and the projection of the knob body, and protrudes outwards and sideways from the short cylindrical portion in a region corresponding to the opening.

12. A steering lock system with a control knob for a vehicle according to claim 11, wherein the knob cap further comprises a plurality of ribs integrally disposed on an inner surface of the knob cap and extending perpendicular to the inner surface of the knob cap.

* * * * *